(No Model.)
F. L. McGAHAN.
EXHAUST STEAM PURIFIER.
No. 462,275. Patented Nov. 3, 1891.
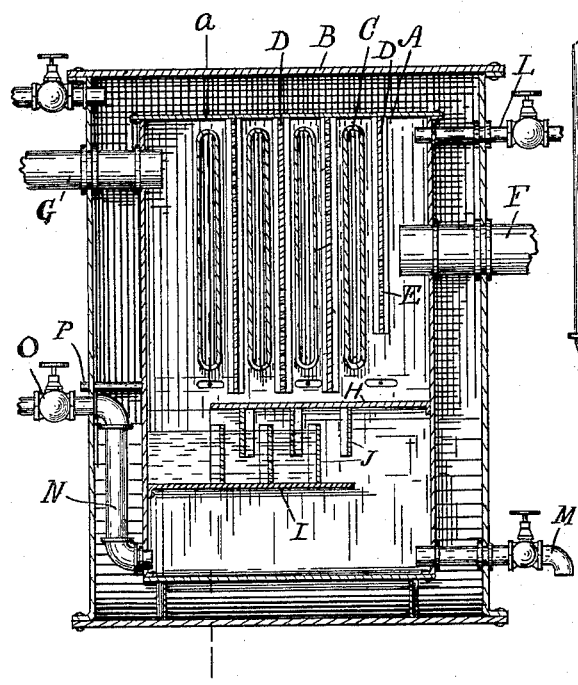
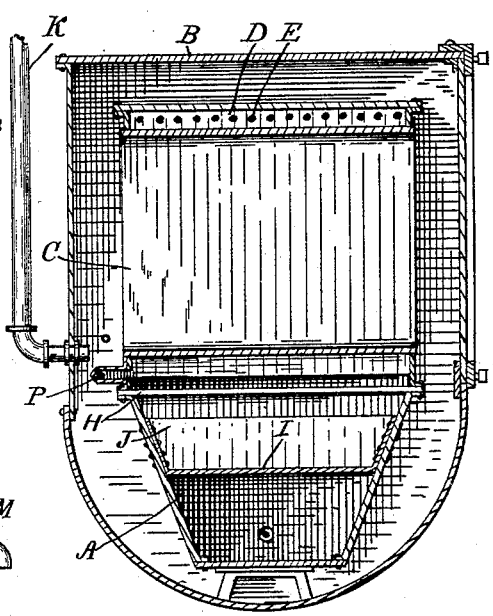
WITNESSES:
C. P. Hood
Mabel Hood
INVENTOR
Fred L. McGahan
BY
H. P. Hood
ATTORNEY.

UNITED STATES PATENT OFFICE.

FRED. L. McGAHAN, OF INDIANAPOLIS, INDIANA.

EXHAUST-STEAM PURIFIER.

SPECIFICATION forming part of Letters Patent No. 462,275, dated November 3, 1891.

Application filed July 20, 1891. Serial No. 400,069. (No model.)

*To all whom it may concern:*

Be it known that I, FRED. L. McGAHAN, a citizen of the United States, residing at Indianapolis, in the county of Marion and State of Indiana, have invented a new and useful Exhaust-Steam Purifier, of which the following is a specification.

My invention relates to an improved apparatus for purifying exhaust-steam by separating therefrom oil and other volatile matter held in suspension therein, the same being shown and described in my pending application for a patent, Serial No. 378,280, for "Improved Apparatus for Condensing Exhaust-Steam."

The object of my improvement is to quickly condense and precipitate from the exhaust-steam any oil or gummy matter which may be carried over from the cylinder of an engine, and to keep the same separated from the water of condensation formed at the same time.

The accompanying drawings illustrate my invention.

Figure 1 represents a central longitudinal section. Fig. 2 represents a transverse section at the line *a*, Fig. 1.

In the drawings, A represents a closed tank surrounded by a water-jacket B. Tank A is provided with a series of flattened tubes C, passing transversely through the tank and open at both ends. Arranged alternately with the tubes C, and parallel therewith, are a series of removable partitions D. Partitions D are provided at their upper and lower edges, alternately, with a series of perforations E. The inlet exhaust-steam pipe F and the outlet exhaust-steam pipe G enter opposite sides of the tank A and at right angles to the tubes C and partitions D. Arranged below tubes C and partitions D are a pair of horizontal partitions H and I, each extending only a part of the length of the tank in opposite directions, and having secured to their opposed surfaces a series of baffle-plates J. The purpose of the tubes C is to permit a free circulation through the tank A of the water contained in the water-jacket B and supplied through the cold-water-supply pipe K, to the end that the vaporized oil entering by the inlet-pipe F may be quickly condensed and thrown upon the horizontal partition H. The purpose of the partition I and baffle-plates J is to form from the condense-water a water-seal, as illustrated in Fig. 1, so as to prevent the passage of steam, oil, or gummy sediment therefrom into the lower part of the tank. For the purpose of cleaning out any sediment which may collect in the lower part of tank A, the upper part of the tank is connected with a source of live-steam supply by a pipe L, and is provided with a blow-off valve and pipe M. Tank A is also provided with a waste-pipe N, which rises from a point near the bottom of the tank to a point above the level of partition H before passing out of the water-jacket, the pipe at that point being furnished with a stop-valve O, and the arrangement being such that when valve O is open the condense-water will stand in tank A level with the lower edges of partitions D. For the purpose of drawing off the oil which may float upon the surface of the water in tank A, a discharge-pipe P is connected with the interior of the tank a little above the normal level of the condense-water therein, and the oil is discharged by closing valve O in pipe N, thus causing the water in tank A to rise above its normal level and to be discharged with the oil thereon through pipe P.

The operation of my device is as follows: The exhaust-steam from the engine, carrying more or less vaporized oil, enters tank A through pipe F, and is projected against the first of the vertical partitions D and passes through the perforations E therein, and thence over and around the first of the flattened tubes C, and thence through and around the remaining partitions D and tubes C, passing out of the tank through pipe G, from whence it is conducted to a condensing apparatus. The cold water entering the water-jacket B through pipe K from any suitable source surrounds tank A and circulates through tubes C, thus reducing the temperature and causing a deposit of all the oil carried by the exhaust-steam upon the horizontal partition H or the water resting thereon. The first water of condensation forming in tank A fills the spaces between the baffle-plates J and prevents the escape of the steam in that direction, and, as the water continues to form, the lower part of the tank is filled with condense-water until the upper level of the outlet-pipe is reached, when the surplus passes off through said pipe. By the use of this device the exhaust-steam from an engine may be purified, so that when condensed it is suitable for making ice or for supplying a steam-boiler.

I claim as my invention—

The above-described exhaust-steam purifier, consisting of the tank having a series of open flattened tubes extending transversely through it, the series of perforated vertical partitions arranged between and alternately with said tubes, the pair of horizontal partitions arranged below said tubes and provided on their opposed surfaces with a series of overlapping baffle-plates, the inlet and outlet pipes for exhaust-steam, and the water-jacket surrounding the tank, all arranged to co-operate substantially as and for the purpose set forth.

FRED. L. McGAHAN.

Witnesses:
H. P. HOOD,
A. M. HOOD.